United States Patent [19]

Collins et al.

[11] Patent Number: 5,046,593
[45] Date of Patent: Sep. 10, 1991

[54] COUPLING ASSEMBLY

[75] Inventors: Marcus H. Collins, Akron; Ronald W. Diesch, Lodi, both of Ohio

[73] Assignee: Eaton Corporation, Cleveland, Ohio

[21] Appl. No.: 560,904

[22] Filed: Jul. 31, 1990

[51] Int. Cl.⁵ .......................... F16D 67/04; F16D 3/70
[52] U.S. Cl. ................................ 192/18 A; 192/30 V; 192/70.17; 192/106.1; 464/71; 267/141.2
[58] Field of Search ............... 192/18 R, 18 A, 30 V, 192/70.17, 106.1, 115; 464/71, 180, 903; 188/73.37; 267/141, 141.2

[56] References Cited

U.S. PATENT DOCUMENTS

| | | | |
|---|---|---|---|
| 2,436,968 | 3/1948 | Longfield | 192/18 A |
| 2,942,708 | 6/1960 | Eason | 192/18 A |
| 3,305,227 | 2/1967 | Henley | 267/141 X |
| 3,469,664 | 9/1969 | Ortlinghaus et al. | 192/18 A |
| 3,650,520 | 3/1972 | Vernon et al. | 267/141 X |
| 3,677,869 | 7/1972 | Chung et al. | 267/141 X |
| 3,897,859 | 8/1975 | Norcia | 192/106.1 X |
| 4,004,669 | 1/1977 | Roderick | 192/70.17 |
| 4,807,731 | 2/1989 | Collins | 192/18 A |

OTHER PUBLICATIONS

Brochure Entitled "Clutch Brake Combination" copyrighted 1989, Eaton Corporation.

Primary Examiner—Richard Lorence
Attorney, Agent, or Firm—Tarolli, Sundheim & Covell

[57] ABSTRACT

An improved coupling assembly includes a polyurethane bushing which cooperates with a friction disc to transmit force. The polyurethane bushing reduces noise caused by components of the coupling assembly and reduces the maximum rate of acceleration between elements of the coupling assembly. The polyurethane bushing has a durometer hardness of approximately 92 Shore A and a Bayshore rebound of 20% to 50%. The maximum rate of acceleration between elements of the coupling assembly is less than 30 times the acceleration of gravity while the coupling assembly transmits a torque load which cyclically varies between at least +12,500 pound inches and at most −2,500 pound inches during rotation of elements of the coupling at a speed of at least 645 revolutions per minute. During the transmission of the aforementioned cyclically varying torque load by the coupling assembly, peak noise level caused by components of the coupling assembly is less than 103 decibels and is less than 3.0 Pascals.

11 Claims, 1 Drawing Sheet

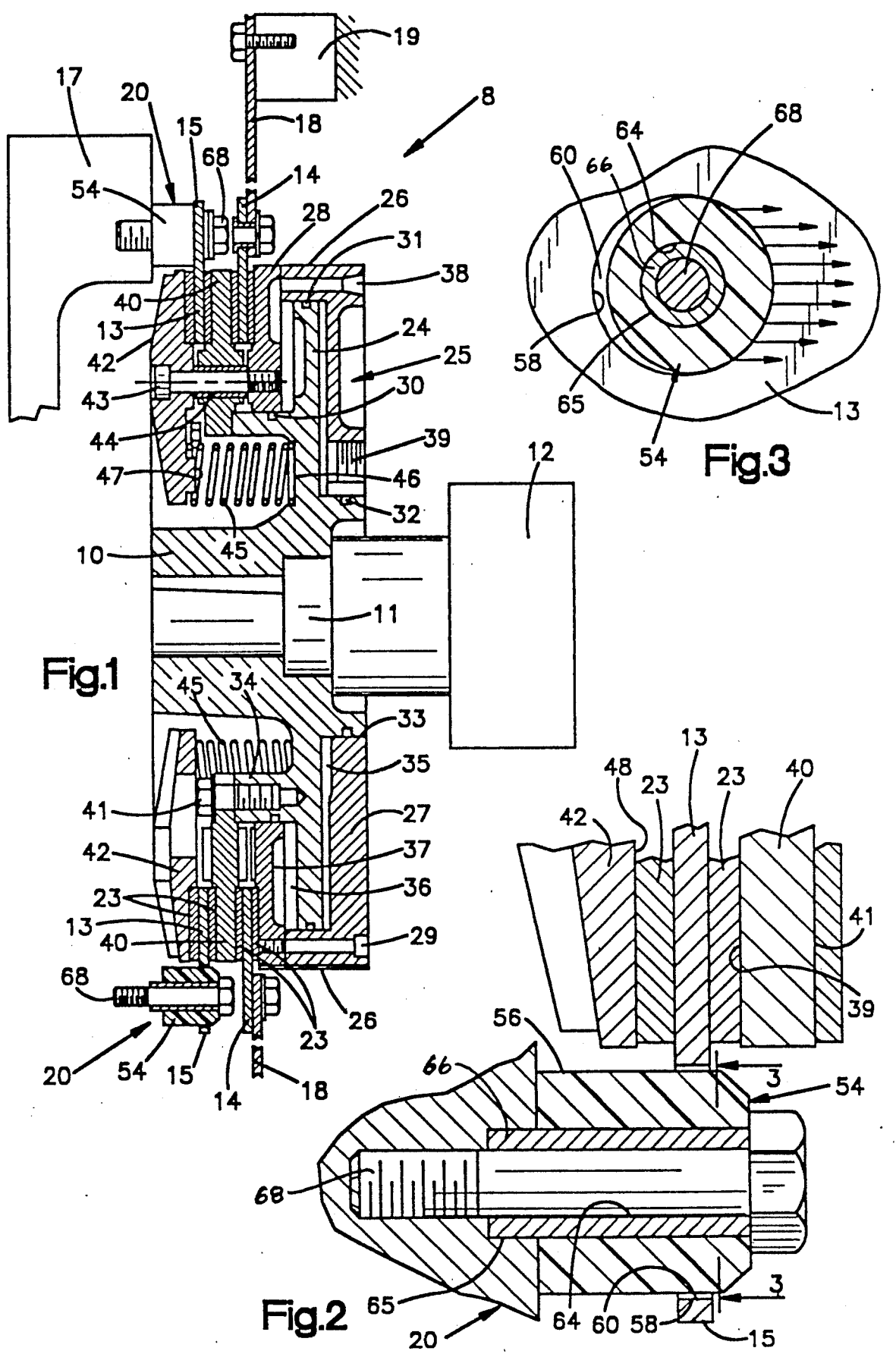

COUPLING ASSEMBLY

BACKGROUND OF THE INVENTION

The present invention relates to a new and improved coupling assembly and more specifically to a coupling assembly which is relatively quiet in operation and which minimizes peak acceleration of components of the coupling assembly.

A coupling assembly having the construction illustrated in U.S. Pat. No. 4,807,731, issued Feb. 28, 1989 and entitled "Clutch and Brake Assembly", has been used to drive a machine at a rate of 250 cycles per minute or more. One machine which has been driven through this coupling assembly is a can-forming machine. During the forming of cans, the load transmitted from components of the machine to the coupling assembly varied in a range between at least +12,500 pound inches and at most −2,500 pound inches. The cyclically varying torque load is applied to the coupling assembly during each revolution of the coupling assembly while the coupling assembly is rotating at a speed of 645 revolutions per minute or more.

The magnitude of the range of the cyclically varying torque will depend on the construction of the can-forming machine and the speed of operation of the can-forming machine. For one specific can-forming machine operating at a speed of 325 cycles per minute or 838 revolutions per minute, the load transmitted from components of the machine to the coupling assembly varied in a range between +35,000 pound inches and −19,000 pound inches. Of course, the range of the torque load will vary as a function of the construction of the machine and the speed of operation of the machine.

This known clutch and brake or coupling assembly has been generally satisfactory in its mode of operation. However, during the transmission of torque through the coupling assembly, an annoying clacking noise is present.

Thus, while the clutch assembly is rotating at a speed of more than 645 rpms and the aforementioned cyclically varying torque load is applied to the clutch assembly during each revolution of the clutch assembly, a peak noise of 3.8 Pascals and 107 decibels was caused by metal-to-metal impact between elements of the coupling assembly. In addition, the coupling assembly transmitted substantial vibrational forces. Thus, components of the coupling assembly experienced a maximum peak tangential acceleration of approximately 48 g's, that is 48 times the acceleration of gravity.

SUMMARY OF THE INVENTION

The present invention reduces the noise caused by components of the coupling assembly and the maximum peak tangential acceleration of components of the coupling assembly during the transmission of a torque load which varies between at least +12,500 pound inches and at most −2,500 pound inches during the transmission of force by the coupling assembly at a speed of at least 645 revolutions per minute. This is accomplished by using a polyurethane bushing to transmit force between a coupling member and another element of the coupling assembly. The coupling member is movable along the outer side surface of the polyurethane bushing and is effective to transmit rotational forces directly between the outer side surface of the polyurethane bushing and the coupling member.

In order to maximize the durability of the polyurethane bushing while minimizing the noise caused by components of the coupling assembly and maximum tangential acceleration of the components of the coupling assembly, the polyurethane bushing has a durometer hardness of approximately 92 Shore A and a Bayshore rebound of approximately 20 to 50%. It has been determined that when a polyurethane bushing having the foregoing characteristics is used in a coupling assembly, peak noise caused by components of the coupling assembly is less than 103 decibels and less than 3.0 Pascals while the coupling assembly transmits a torque load which varies between at least +12,500 and at most −2,500 pound inches during rotation of components of the coupling assembly at a speed of at least 645 revolutions per minute. It has also been determined that the maximum rate of tangential acceleration of components of the coupling assembly is less than 30 times the acceleration of gravity while the coupling assembly is transmitting the aforementioned variable torque load.

Accordingly, it is an object of this invention to provide a new and improved coupling assembly which is relatively quiet and which has relatively low peak accelerations and wherein the coupling assembly includes a polyurethane bushing which transmits forces between components of the coupling assembly.

Another object of this invention is to provide a new and improved coupling assembly as set forth in the previous object and wherein the coupling assembly has a peak noise level of less than 103 decibels and 3.0 Pascals while transmitting a reversing torque load which varies between at least +12,500 and at most −2,500 pound inches during rotation of components of the coupling assembly at a speed of at least 645 revolutions per minute.

BRIEF DESCRIPTION OF THE DRAWINGS

The foregoing and other objects and features of the present invention will become more apparent upon a consideration of the following description taken in connection with the accompanying drawings, wherein:

FIG. 1 is a longitudinal sectional view of a coupling assembly constructed in accordance with the present invention;

FIG. 2 is an enlarged sectional view illustrating the relationship between a polyurethane bushing and a friction disc of the coupling assembly of FIG. 1; and FIG. 3 is a schematic illustration, taken along the line 3—3 of FIG. 2, illustrating the manner in which force is transmitted between the polyurethane bushing and a friction disc of the coupling assembly.

DESCRIPTION OF ONE SPECIFIC PREFERRED EMBODIMENT OF THE INVENTION

The illustrated embodiment of the invention is in conjunction with a coupling assembly 8 having the same general construction as the coupling assembly disclosed in U.S. Pat. No 4,870,731, issued Feb. 28, 1989 and entitled "Clutch and Brake Assembly". The coupling assembly 8 is a combined clutch and brake assembly and includes a hub 10 which is keyed, or otherwise fixed, to the input shaft 11 of a machine 12, typically, a can forming press, punching machine or the like operating at high speed or duty cycles. The assembly is subjected to torque reversals via the shaft 11 in excess of 250 cycles per minute, for example 300 to 400 cycles per minute. During each revolution of the shaft 11, the torque load to which the shaft is subjected by the other component of the machine 12 varies between at least +12,500 and at most −2,500 pound inches. For example, the torque load may vary between +35,000 and −19,000 pound inches.

A clutch disc or coupling member 13 has a clutch plate 15 which is secured to a driving member 17 by connector assemblies 20, constructed in accordance with the present invention. The driving member 17 is a flywheel in typical applications. A brake disc or coupling member 14 has reaction arms 18 connected to a stationary frame 19. Both faces of each of the discs 13 and 14 have a disc 23 made of friction material which is riveted or otherwise secured to the faces of the discs 13 and 14.

The hub 10 is provided with an integrally formed fixed piston 24 extending radially from the hub which coacts with an annular axially movable cylinder, generally referred to by the numeral 25. The cylinder 25 is formed by an outer cylindrical portion 26, an annular radially extending portion 27 and an annular brake plate 28. Portion 26 is secured to the brake plate 28 by a plurality of bolts 29 extending through the portion 26. The piston 24 is provided with three annular seals 30, 31 and 32.

Another pressure or actuator chamber 36 is formed by the wall 37 of the brake plate 28 and the other side of the piston 24. Passageways 38 and 39 are provided in the portions 26 and 27 of the cylinder, each connected to a source of pressurized fluid and a fluid circuit (not shown) for pressurizing alternately the chambers 35 and 36 by connecting passageway 38 to exhaust when passageway 39 is pressurized and visa versa. On a side of the brake plate 28 opposite from the chamber 36 the brake plate has a flat annular friction surface which is engageable with a friction disc 23 connected to the brake disc or coupling member 14.

An annular rotor or coupling member 40, which may be ventilated, is fixed to the piston flange 34 by a plurality of bolts 41 extending through holes in the radial inner portion so that the rotor 40 is spaced from brake plate 28 and is interposed between the clutch disc 15 and the brake disc 14. Since piston 24 is fixed to the hub and the rotor 40 is fixed to the piston, the rotor 40, piston 24, and hub 10 rotate together as a unit but do not move axially. The rotor or coupling member 40 has flat annular friction surfaces 39 and 41 (FIG. 2) which are engageable with the friction discs 23 connected to the clutch disc 13 and brake disc 14.

An annular clutch plate or coupling member 42 (FIG. 1) is secured to the brake plate 28 by bolts 43 extending through spacer tubes 44 which spaces the clutch plate, a predetermined distance from the brake plate 28 for engagement with the clutch disc 15. The clutch plate 42, brake plate 28 and the cylinder 25, move axially as a unit. A plurality of coil springs 45 are mounted between the clutch plate 42 and the piston 24. One end of each spring 45 is positioned in a depression 46 in the piston and the other end is positioned over a circular projection 47 formed on the face of the clutch plate to hold the springs in position. The clutch plate 42 has a flat annular friction surface 48 (FIG. 2) which is engageable with the friction disc 23 connected to the clutch disc 13.

The coupling assembly 8 operates to couple the machine shaft 11 to the driving member 17 when fluid pressure in the chamber 35 exceeds the pressure of the springs 45 and urges the clutch plate 42 to the right, as viewed in the drawing, toward the clutch disc to engage the friction discs 23, secured to the clutch disc, with the clutch plate 42 and the rotor 40. At the same time, the brake plate 28 moves to the right and is disengaged from the friction disc secured to the brake disc 14. The assembly acts in its braking mode when chamber 35 is depressurized. At the same time that chamber 35 is being depressurized, the chamber 36 is being pressurized which provides additional braking torque and causes the chamber 35 to be exhausted or depressurized faster than if the chamber 35 was depressurized only by the biasing forces of the springs 45 urging the cylinder portion 27 toward the piston 24.

In accordance with a feature of the present invention, each of the connector assemblies 20 is effective to minimize both noise and tangential acceleration of components of the coupling assembly 8 during the transmission of drive forces from the driving or input element 17 to the driven or output element 10 of the coupling assembly. To accomplish this, the connector assembly 20 includes a polyurethane bushing 54 (FIG. 2).

A cylindrical outer side surface 56 of the polyurethane bushing 54 is disposed in abutting engagement with a cylindrical side surface 58 (FIG. 3) of an opening 60 formed in the clutch plate 15. In addition, the bushing 54 has a cylindrical inner side surface 64 (FIG. 2) which is bonded to a cylindrical outer side surface 65 of a cylindrical metal sleeve 66 mounted on a bolt 68. The sleeve is received in an opening in the driving member 17. The bolt 68 is fixedly connected with the driving member 17.

During operation of the coupling assembly 8 between an engaged condition and a disengaged condition, the cylindrical side surface 58 of the opening 60 in the clutch disc 13 slides axially along the cylindrical outer side surface 56 of the bushing 54. During the transmittal of torque by the coupling assembly 8, a portion of the cylindrical side surface 58 of the opening 60 in the clutch disc 13 is disposed in abutting engagement with the cylindrical outer side surface of the bushing 54 to transmit rotational forces between the clutch disc and the bushing in the manner shown schematically in FIG. 3. Upon a reversal in the torque load transmitted by the coupling assembly 82, an area of pressure engagement between the clutch disc surface 58 and bushing surface 56 shifts from one side of the bushing 54 to the diametrically opposite side of the bushing.

The polyurethane bushing 54 cooperates with the clutch disc 13 to minimize noise during the transmission of torque by the coupling assembly 8 and to minimize the transmission of vibration by the coupling assembly. To promote the minimization of noise and the minimization of the transmission of vibration, the polyurethane bushing 54 has a durometer hardness of approximately 92 Shore A. The polyurethane bushing 54 has a Bayshore rebound of approximately 20% to 50% when tested in accordance with the American Society for Testing and Materials standard Designation 2632 (approved 1979 and reapproved 1981) and entitled "Standard Test Method for Rubber Property-Resilience by Vertical Rebound".

Since the cylindrical inner side surface 58 of the opening 60 in the clutch disc 13 directly engages and transmits force from the outer side surface 56 of the polyurethane bushing 54, there is no metal-to-metal contact between the annular clutch disc 13 and a component of the connector assembly 20. This enables the clutch assembly 8 to transmit a cyclically varying torque load with a minimum of noise and vibration. Thus, during operation of the machine 12, the clutch assembly 8 is subjected to a torque load which varies between at least +12,500 pound inches and at most −2,500 pound inches during each cycle while the shaft is being rotated at a speed of at least 645 revolutions or 250 cycles per minute. Each time the torque load changes from positive to negative, the force transmitting area between the bushing 54 and clutch disc 13 changes from one side of the bushing to the diametrically opposite side of the bushing.

It should be understood that the specific range of torque loads to which the clutch assembly is subjected will vary depending upon the specific construction of the machine 12. Thus, the torque load may vary between more than +12,500 pound inches and less than −2,500 pound inches depending upon the specific construction of the machine 12 and the speed at which it is operated. For example, the torque load may vary between +35,000 and −19,000 pound inches during operation of a specific machine at a selected speed. Generally speaking, as the operating speed of the machine increases, the positive torque load to which the clutch assembly is subjected increases and the negative torque load to which the clutch assembly is subjected increases in negative amplitude.

Due to the characteristics of the polyurethane bushing 54, the maximum rate of acceleration of the driving member or element 17 and driven member or element 11 is minimized. This minimizes the amount of vibration transmitted through the clutch assembly 8 while the machine 12 is subjecting the clutch assembly to a torque load which cyclically varies between at least +12,500 pound inches and at most −2,500 pound inches during rotation of the driving and driven elements 17 and 11 at a speed of at least 645 revolutions per minute. It has been found that the rate of tangential acceleration of driving and driven elements 17 and 11 is less than 30 times the acceleration of gravity while the clutch assembly is being subjected to the aforementioned varying torque load at a speed of at least 645 revolutions per minute.

When the connector assembly 20 has the construction illustrated in the aforementioned U.S. Pat. No. 4,807,731, the maximum rate of acceleration of the driving and driven elements 17 and 11 under the influence of the aforementioned varying torque loads and at a speed of 645 revolutions per minute was approximately 48 times the acceleration of gravity. When the connector assembly 20 of FIG. 2 was substituted for the connector assembly disclosed in the aforementioend U.S. Pat. No. 4,807,731 and subjected to the same cyclically varying torque loads at the same operating speed, the maximum rate of acceleration of the driving and driven elements 17 and 11 decreased to between 18 and 28 times the acceleration of gravity. Specifically, when the polyurethane bushing 54 had a 20% Bayshore rebound, the maximum acceleration was 28 times the acceleration of gravity. When the polyurethane bushing 54 had a Bayshore rebound of 50%, the maximum acceleration of the driving and driven elements 17 and 11 was 18 times the acceleration of gravity.

The peak noise caused by components of the coupling assembly 8 during driving of the machine 12 by forces transmitted through the coupling assembly is minimized by the characteristics of the polyurethane bushing 54. Thus, when the coupling assembly is driving the machine 12 at a speed of at least 645 revolutions per minute and is subjected to a torque load which varies between at least +12,500 pound inches and at most −2,500 pound inches, the peak noise level is less than 103 decibels and is less than 3.0 Pascals. The relatively low noise level is, in part at least, due to the fact that the clutch disc 13 directly transmits rotational forces to the outer side surface 56 of the polyurethane bushing 54. Therefore, there is no metal-to-metal contact between components of the connector assembly 20 and other elements of the coupling assembly 8.

When the connector assembly 20 is constructed in the manner disclosed in the aforementioned U.S. Pat. No. 4,807,731, there is an objectionable clacking noise and relatively high peak noise levels. It is believed that these relatively high peak noise levels are due, in part at least, to metal-to-metal engagement between the clutch disc and components of the connector assembly and/or between components of the connector assembly.

When the coupling assembly 8 is driving the machine 12 at a speed of at least 645 revolutions per minute and is being subjected to a torque load which cyclically varies between at least +12,500 pound inches and at most −2,500 pound inches, the peak noise level is less than 103 decibels and less than 3.0 Pascals. Thus, the peak noise level with a polyurethane bushing 54 having a Bayshore rebound of 20% was 102 decibels and 2.5 Pascals. When the polyurethane bushing 54 had a 50% Bayshore rebound, the peak noise level was 100 decibels and 2.0 Pascals. When a coupling assembly having the construction illustrated in the aforementioned U.S. Pat. No. 4,807,731 was subjected to the same torque loads and at the same operating speed, the components of the coupling assembly had a peak noise level of 107 decibels and 3.8 Pascals.

In view of the foregoing description, it is apparent that present invention reduces the noise caused by components of the coupling assembly and the maximum peak tangential acceleration of components of the coupling assembly during the transmission of a torque load which varies between at least +12,500 pound inches and at most −2,500 pound inches during the transmission of force by the coupling assembly at a speed of at least 645 revolutions per minute. This is accomplished by using a polyurethane bushing 54 to transmit force between a friction disc or coupling member 13 and an element 68 of the coupling assembly. The coupling member 13 disc is movable axially along the outer side surface 56 of the polyurethane bushing 54 and is effective to transmit rotational forces directly between the outer side surface of the polyurethane bushing and the coupling member.

In order to maximize the durability of the polyurethane bushing 54 while minimizing the noise caused by components of the coupling assembly 8 and maximum tangential acceleration of the components of the coupling assembly, the polyurethane bushing has a durometer hardness of approximately 92 Shore A and a Bayshore rebound of approximately 20 to 50%. It has been determined that when a polyurethane bushing 54 having the foregoing characteristics is used in a coupling assembly, peak noise caused by components of the coupling assembly is less than 103 decibels and less than 3.0 Pascals while the coupling assembly transmits a torque load which varies between at least +12,500 and at most −2,500 pound inches during rotation of components of the coupling assembly at a speed of at least 645 revolutions per minute. It has also been determined that the maximum rate of tangential acceleration of components of the coupling assembly 8 is less than 30 times the acceleration of gravity while the coupling assembly is transmitting the aforementioned variable torque load.

Having described a preferred embodiment of the invention, the following is claimed:

1. A coupling assembly operable from a disengaged condition to an engaged condition to retard relative rotation between first and second elements, said coupling assembly comprising an axially movable coupling member, connector means for connecting said coupling member with the first element, friction surface means connected with the second element, and actuator means for operating said coupling assembly from the disengaged condition to the engaged condition by pressing said friction surface means against said coupling member to apply axial and rotational forces to said coupling member, said connector means including a polyurethane bushing connected with the first element and force transmitting surface means connected with said coupling member and disposed in abutting engagement with an outer side surface of said polyurethane bushing, said force transmitting surface means being effective to transmit rotational forces between said coupling member and the outer side surface of said polyurethane bushing when said coupling assembly is in the engaged condition.

2. A coupling assembly as set forth in claim 1 wherein said polyurethane bushing has a Bayshore rebound of 20% to 50%.

3. A coupling assembly as set forth in claim 1 wherein said polyurethane bushing has a durometer hardness of 92 Shore A.

4. A coupling assembly as set forth in claim 1 wherein the first and second elements rotating at a speed of at least 645 revolutions per minute and at least one of the first and second elements is subjected to a torque load which cyclically varies between at least +12,500 pound inches and at most −2,500 pound inches.

5. A coupling assembly as set forth in claim 1 wherein the maximum rate of acceleration of the first and second elements is less than 30 times the acceleration of gravity while said coupling assembly transmits torque load which cyclically varies between at least +12,500 pound inches and at most −2,500 pound inches during rotation of said first and second elements at a speed of at least 645 revolutions per minute.

6. A coupling assembly as set forth in claim 1 wherein said coupling assembly has a peak noise level caused by components of said coupling assembly is less than 103 decibels while said coupling assembly transmits a torque load which varies between +12,500 pound inches and −2,500 pound inches during rotation of said first and second elements at a speed of at least 645 revolutions per minute.

7. A coupling assembly as set forth in claim 1 wherein said coupling assembly has a peak noise level of less than 3.0 Pascals while said coupling assembly transmits a torque load which varies between +12,500 and −2,500 pound inches during rotation of said first and second elements at a speed of at least 645 revolutions per minute.

8. A brake and clutch apparatus comprising:
   a hub adapted to be fixed to and rotatable with a driven member;
   an annular piston means rotatable with said hub;
   a rotor;
   means connecting said rotor with said piston means;
   cylinder means cooperating with said piston means to form an annular pressure chamber;
   a brake plate positioned at one side of said rotor;
   an axially movable annular clutch plate positioned at one side of said rotor opposite from said one side;
   a drivable rotatable clutch disc and a non-rotatable brake disc, said rotor disposed between said clutch disc and brake disc;
   annular friction means disposed on opposite faces of said clutch disc and brake disc;
   means for connecting said clutch disc to a rotatable driving member;
   means for connecting said brake disc to a fixed part;
   spring means for biasing said brake disc toward said rotor to enable a braking torque to be applied to the driven shaft;
   passage means for admitting pressure fluid to said pressure chamber whereby the biasing forces are removed from said brake disc and said clutch plate and clutch disc are moved axially relative to the driving member to connect the driving member with the driven member;
   said means for connecting said clutch disc to a rotatable driving member including a polyurethane bushing, said clutch disc including surface means slidable along an outer side surface of said polyurethane bushing upon movement of said clutch plate and clutch disc relative to the driving member, said clutch disc and polyurethane bushing being effective to transmit rotational forces when the driving member is connected with the driven member.

9. A brake and clutch apparatus as set forth in claim 8 wherein said polyurethane bushing has a Bayshore rebound of approximately 20% to 50% and a durometer hardness of approximately 92 Shore A.

10. A brake and clutch apparatus as set forth in claim 8 wherein the rate of acceleration of the driven member is less than 30 times the acceleration of gravity and the peak noise level caused by components of said coupling assembly is less than 103 decibels while said coupling assembly transmits a torque load which cyclically varies between at least +12,500 pound inches and at most −2,500 pound inches during rotation of said first and second elements at a speed of at least 645 revolutions per minute.

11. A coupling assembly as set forth in claim 1 wherein said force transmitting surface means slides along the outer side surface of said polyurethane bushing upon axial movement of said coupling member.

* * * * *